Patented July 15, 1947

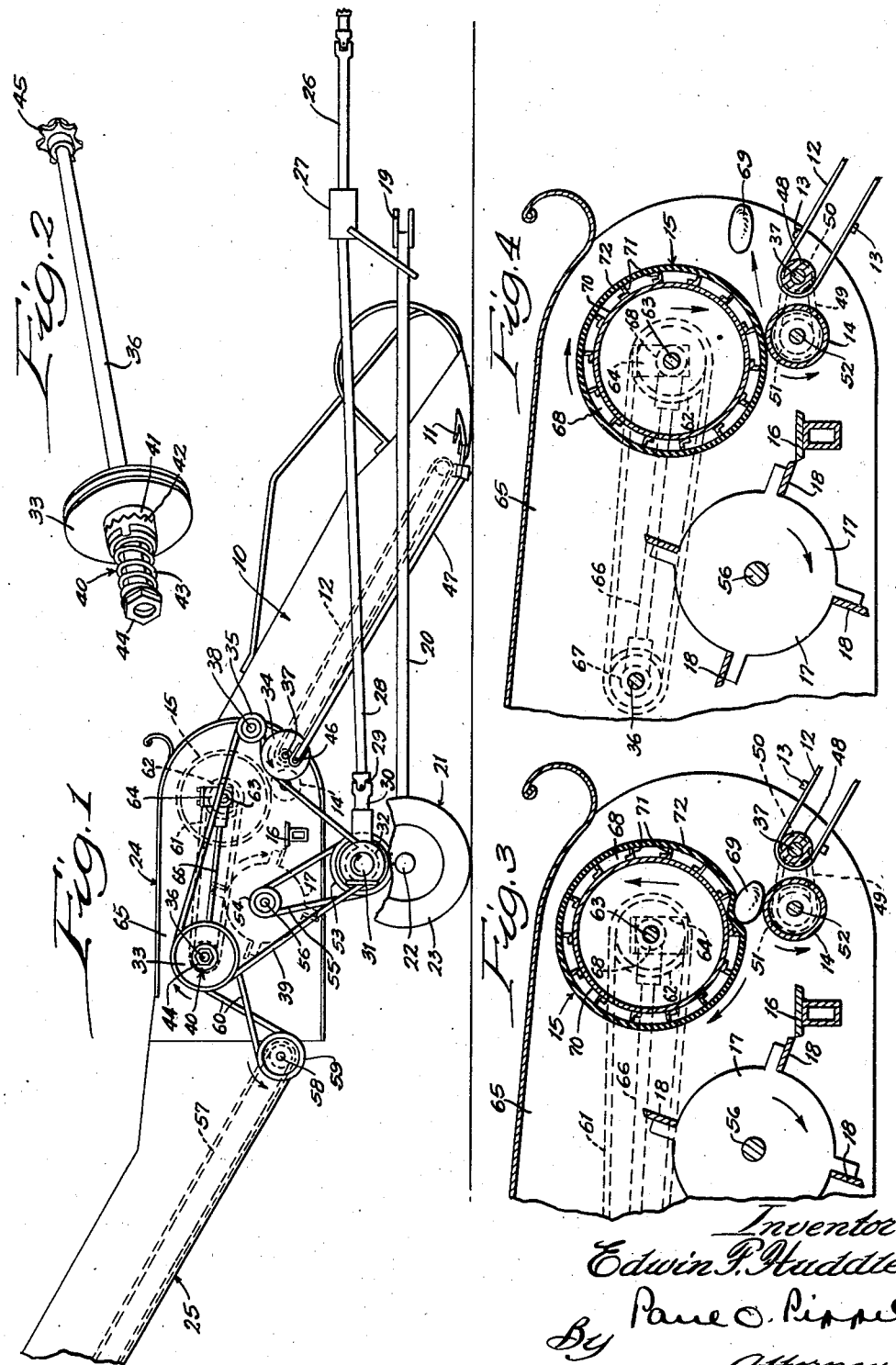

2,424,171

UNITED STATES PATENT OFFICE 2,424,171

STONE EJECTOR FOR FIELD HAY CHOPPERS

Edwin F. Huddle, Elmwood Park, Ill., assignor to International Harvester Company, a corporation of New Jersey Application September 18, 1944, Serial No. 554,613

4 Claims. (Cl. 146—120)

This invention relates to a new and improved stone ejector for field hay choppers and has for one of its principal objects the provision of means for automatically ejecting stones, roots, and other foreign objects from the hay or other cereal prior to the time the hay enters the cutting or treating chamber, thereby to save the chopper mechanism from damage.

An important object of this invention is to provide a convertible feed roll for field hay choppers in which the roll with radially extending paddles may be employed when the hay is dry, and the same roll with a rubber covering wrapped therearound may be used with a green-field hay chopper. Field hay choppers for dry hay are not likely to pick up stones or the like as the dry hay pick-up device comprises a rotor including a plurality of spaced fingers. A green-field hay chopper includes a harvester or mowing element which rides on or close to the ground, in which position it is capable of and does at times pick up stones rocks or other objects. These stones are fed along with the cut hay up a conveyer to a hay-treating mechanism, such as a chopper, and may cause serious damage to the chopping knives. Hence it is an important object to remove these stones from the machine prior to the time they are permitted to enter the chopping compartment.

Other and further important objects of this invention will become apparent from the disclosures in the following specification and accompanying drawings, in which:

Figure 1 is a side elevation of the field hay chopper of this invention;

Figure 2 is a perspective view detail of one of the machine's operating shafts;

Figure 3 is a detail sectional view of a portion of the field hay chopper of Figure 1, showing the ejector roll in greater detail; and Figure 4 is a view similar to Figure 3 showing a stone being ejected.

In the drawings:

Reference numeral 10 indicates generally a scoop shovel type of platform for a field hay chopper. The device as shown incorporates a mower cutter-bar 11 and is adapted to cut standing cereals such as grain or hay and carry it up an elevator 12 by means of slats or the like 13, where it enters feed rolls 14 and 15. The cut grain is fed by compression between the feed rolls 14 and 15 and is thereupon delivered to a stationary knife 16. As the material is fed over this knife 16, a rotary cutting member 17 having radially extending knives 18 shears the material into short lengths.

The field hay chopper is pulled through the fields by means of a draft vehicle such as a tractor, and it is provided with a hitch or clevis member 19 which is readily attachable to a tractor draw-bar. The clevis 19 forms the forward end of a tongue 20 which projects forwardly from a wheel truck 21. The wheel truck 21 includes an axle 22 and a pair of wheels 23. The scoop shovel platform 10, a cutting or grain-treating chamber 24, and an elevator 25 constitute the field hay chopper, which is mounted so that it is substantially balanced on and over the wheel axle 22. A tractor power take-off is used to drive the field hay chopper driven elements. An auxiliary engine may furnish power for chopper also. A drive shaft 26 joins the tractor power take-off (not shown) and extends rearwardly to a universal point 27. A shaft 28 continues rearwardly to a universal joint 29 which has a further rearward extension 30 adapted to drive bevel gears (not shown) and to impart rotation to the transverse shaft 31. A pulley 32 is mounted on the shaft 31 and lies in a common plane with pulleys 33, 34, and 35. These pulleys are mounted on transverse shafts 36, 37, and 38 respectively. A V-belt 39 is adapted to extend around these pulleys and imparts rotating drive from the tractor power take-off to these numerous transverse shafts.

As best shown in Figure 2, the shaft 36 has a slip clutch 40. This slip clutch is associated with the pulley 33 in that it has one clutch member 41 fixedly attached to the pulley, and the other opposed clutch member 42 is attached to the shaft 36 through the medium of a spring 43 and a nut 44. The other end of the shaft 36 has keyed or otherwise attached thereto a sprocket 45.

The sprocket 34 on shaft 37 is equipped with a crank 46 which is adapted to drive a pitman 47 to effect reciprocal operation of the cutter-bar 11. As best shown in Figure 3, this shaft 37 forms the support for the upper roller 48 of the conveyor 12. A short V-belt 49, with the aid of sprockets 50 and 51, joins the shaft 37 to a cross-shaft 52 on which is mounted the lower feed roll 14.

Another pulley 53 mounted on the shaft 31 is adapted to drive a pulley 54 by means of a V-belt 55. The pulley 54 is in turn mounted on cross-shaft 56 which supports the rotatable cutter head 17.

The elevator 25 includes a belt-type conveyor 57 which is driven from the shaft 58 on which is mounted the pulley 59. The pulley 59 is driven from the shaft 36 by means of a pulley (not shown) and a crossed V-belt 60.

The end of the shaft 36 which carries the sprocket 45 is on the opposite side of the machine from that shown in Figure 1. The sprocket 45 is adapted to drive a chain 61 which extends around a sprocket 62 mounted on a shaft 63. The upper feed roll 15 is mounted on this shaft 63 which is arcuately floatable. The shaft 63 is adapted to "float" through substantially vertical opposed slots 64 in the side walls 65 of the grain cutting or treating compartment 24. An arm 66 is hinged at 67 about the shaft 36. The free end of the arm 66 is joined at 68 to the shaft 63, and it is apparent that the shaft 63 may swing upwardly through an arc described about the shaft 36.

When a stone is picked up by the cutter-bar 11 and carried up by means of the conveyor 12, the feed rolls 14 and 15 attempt to carry the stone through in the same manner as it feeds hay or other grain. The upper roll 15 is capable of yielding upwardly a distance defined by the height of the slot 64. As the shaft 63 strikes the upper end of the slot 64, the feed roll 15 fails to yield further. If the stone 69 is larger than the space between the feed rolls 14 and 15, it will tend to stop the feed roll 15 and the slip clutch 40 will permit the pulley 33 to be rotated without imparting rotation to the shaft 36 which drives the feed roll 15.

The feed roll 15 comprises a cylindrical base 70 and includes radially extending paddle or rib members 71 which are in the form of angle irons welded longitudinally of the roll and around the circumference thereof. As previously stated, when field hay choppers are used to pick up dry hay, there is only a slight chance of picking up stones or other foreign objects, and the feed roll is used with merely the base 70 and the radial paddles 71. However, when it is used with a harvesting mechanism such as employed in the device as shown, a rubber or any other elastic material covering 72 is stretched around the outer edges of the paddles or ribs 71.

Referring now to Figure 3, the stone 69, if permitted to enter the cutting chamber 24, would most certainly cause a breaking of the rotatable knives 18. The purpose of this invention is to eject stones such as the one 69. The roll 15 as shown has reached its uppermost position and the taut rubber covering 72 has been compressed between two of the ribs 71. The slip clutch 73 is of the type wherein immediately upon the clutch slipping one tooth it again grips and attempts to drive the shaft 36. This causes an intermittent starting and stopping or an attempted starting and stopping of the rubber-covered feed roll 15. The rubber covering thereupon tends to contract or pull out straight where it is holding the stone 69, and the stone is ejected as shown in the position in Figure 4. In this Figure 4 position, the roll 15 has resumed its normal relationship with respect to the feed roll 14 with the shaft 63 in the bottom of the slots 64.

It is apparent that herein has been provided a novel stone ejector for field hay choppers. The intention is to limit the invention only within the scope of the appended claims.

What is claimed is:

1. In a stone ejecting mechanism for hay- or grain-treating machines comprising, a pair of opposed feed rolls, and means associated with one of said rolls for effecting ejection of stones from the machine, said means including radially projecting ribs on said roll and having a superposed annular rubber covering stretched over the outer edges of said radially projecting ribs, whereby space pockets are provided at intervals around the roll.

2. In a stone ejecting mechanism for hay- or grain-treating machines comprising, a pair of opposed feed rolls, and means associated with one of said rolls for effecting ejection of stones from the machine, said means including radially projecting ribs on said roll and a taut elastic material covering extending around the outer edges of said ribs, said roll being arcuately floatable.

3. In a stone ejecting machine, a pair of cooperating feed rolls, driving means for said feed rolls, and a slip clutch positioned between said driving means and at least one of said feed rolls, said one feed roll having radially projecting ribs and a circular rubber covering extending around the outer edges of said projecting ribs leaving space pockets defined and enclosed by two adjacent ribs and the outer rubber covering, whereby stones are automatically ejected from a position between said feed rolls when the stone causes inward stretching of the rubber covering and the action of the slip clutch intermittently drives said one feed roll and tends to cause the rubber covering to resume its original position.

4. In a stone ejecting mechanism for cereal-treating machines comprising a pair of cooperating feed rolls, driving means for said feed rolls, a slip clutch positioned between said driving means and at least one of said feed rolls, said one feed roll being arcuately floatable above the other of said feed rolls and having radially projecting ribs and a taut rubber covering stretched around a circular path defined by the outer edges of the radially projecting ribs, whereby stones are automatically ejected from said machine when they cause an inward stretching of the rubber between the ribs and a tendency for the rubber covering to resume its original circular position.

EDWIN F. HUDDLE.

REFERENCES CITED

The following references are of record in the file of this patent:

UNITED STATES PATENTS

| Number | Name | Date |
|---|---|---|
| 2,342,282 | Hill | Feb. 22, 1944 |
| 1,631,446 | Worthington | June 7, 1927 |
| 77,209 | Parsons | Apr. 28, 1868 |
| 285,422 | Lockhart | Sept. 25, 1883 |
| 2,385,451 | Krause et al. | Sept. 25, 1945 |
| 767,086 | Scovil | Aug. 9, 1904 |

FOREIGN PATENTS

| Number | Country | Date |
|---|---|---|
| 11,933 | Great Britain | Aug. 18, 1888 |